(12) United States Patent
Shidahara et al.

(10) Patent No.: US 8,806,962 B2
(45) Date of Patent: Aug. 19, 2014

(54) TORQUE DETECTION DEVICE AND ELECTRIC POWER STEERING SYSTEM INCLUDING THE SAME

(71) Applicant: JTEKT Corporation, Osaka (JP)

(72) Inventors: Yasushi Shidahara, Munich (JP); Akihiro Takeuchi, Kashiba (JP); Genki Nishikawa, Toyota (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/743,884

(22) Filed: Jan. 17, 2013

(65) Prior Publication Data

US 2013/0192390 A1 Aug. 1, 2013

(30) Foreign Application Priority Data

Feb. 1, 2012 (JP) .................................. 2012-020380

(51) Int. Cl.
*G01L 3/00* (2006.01)
(52) U.S. Cl.
USPC ................................................... 73/862.325
(58) Field of Classification Search
USPC .................. 73/862.325, 862.331–862.338
See application file for complete search history.

(56) References Cited

U.S. PATENT DOCUMENTS

| | | | | |
|---|---|---|---|---|
| 7,415,898 B2* | 8/2008 | Ishihara et al. | .......... | 73/862.331 |
| 7,555,963 B2* | 7/2009 | Maehara | .................. | 73/862.333 |
| 7,562,590 B2* | 7/2009 | Tokumoto et al. | ....... | 73/862.331 |
| 7,568,400 B2* | 8/2009 | Tokumoto et al. | ........ | 73/862.333 |
| 7,723,878 B2* | 5/2010 | Yagai et al. | ...................... | 310/71 |
| 7,798,019 B2* | 9/2010 | Osuka et al. | ............. | 73/862.331 |
| 8,015,885 B2* | 9/2011 | Arita et al. | ................ | 73/862.333 |
| 8,393,230 B2* | 3/2013 | Jeon et al. | ................. | 73/862.193 |
| 8,448,528 B2* | 5/2013 | McDonald et al. | ...... | 73/862.331 |
| 2008/0028870 A1 | 2/2008 | Tokumoto et al. | | |
| 2010/0071481 A1 | 3/2010 | Arita et al. | | |
| 2011/0005340 A1 | 1/2011 | Jeon et al. | | |
| 2013/0220030 A1* | 8/2013 | Nishikawa et al. | ...... | 73/862.331 |

FOREIGN PATENT DOCUMENTS

EP 1 442 960 A2 8/2004
JP A 2008-249598 10/2008

OTHER PUBLICATIONS

May 16, 2014 Search Report issued in European Patent Application No. 13152895.2.

* cited by examiner

*Primary Examiner* — Lisa Caputo
*Assistant Examiner* — Octavia D. Hollington
(74) *Attorney, Agent, or Firm* — Oliff PLC

(57) ABSTRACT

A torque detection device includes: a magnetic flux collecting unit, and a sensor housing. The magnetic flux collecting unit includes a holder, first and second magnetic flux collecting rings, and a magnetic shield. The holder has upper and lower through-holes. The first and second magnetic flux collecting rings are fitted to an inner periphery of the holder. The magnetic shield is fitted to an outer periphery of the holder so as to cover the through-holes. The sensor housing is formed integrally with the magnetic flux collecting unit by supplying resin onto an outer periphery of the magnetic flux collecting unit. The holder has a resin flow passage in its outer periphery. Resin that is supplied at the time of forming the sensor housing flows into the through-holes through the resin flow passage.

6 Claims, 10 Drawing Sheets

TORQUE DETECTION DEVICE AND ELECTRIC POWER STEERING SYSTEM INCLUDING THE SAME

INCORPORATION BY REFERENCE/RELATED APPLICATION

This application claims priority to Japanese Patent Application No. 2012-020380 filed on Feb. 1, 2012 the disclosure of which, including the specification, drawings and abstract, is incorporated herein by reference in its entirety.

BACKGROUND OF THE INVENTION

1. Field of the Invention

The invention relates to a torque detection device including: a magnetic flux collecting unit that includes a holder that has a holding protrusion and a through-hole located next to the holding protrusion, a magnetic flux collecting ring fitted to the inner periphery of the holder, and a magnetic shield fitted to the outer periphery of the holder so as to cover the through-hole; and a sensor housing formed integrally with the magnetic flux collecting unit by supplying resin onto the outer periphery of the magnetic flux collecting unit, and relates also to an electric power steering system (EPS) that includes the torque detection device.

2. Discussion of Background

A torque detection device described in US2010/0071481 A1 includes a unit that has magnetic flux collecting rings and a ring holder that holds the magnetic flux collecting rings. The unit is inserted into a housing through an insertion hole formed in the housing, and is fixed to the housing.

For example, water may enter the inside of the torque detection device described in US2010/0071481 A1 through a gap between the unit and the housing. There is a torque detection device in which a sensor housing is formed integrally with a magnetic flux collecting unit by supplying resin onto the outer periphery of the magnetic flux collecting unit in order to improve the waterproof property. The magnetic flux collecting unit includes a holder, magnetic flux collecting rings and a magnetic shield. The holder has holding protrusions formed on its inner periphery and through-holes located next to the holding protrusions. The magnetic flux collecting rings are fitted to the inner periphery of the holder. The magnetic shield is fitted to the outer periphery of the holder so as to cover the through-holes.

However, in process of supplying resin, portions of the magnetic shield, which face the through-holes, may deform due to resin pressure. This decreases the accuracy of calculation of a torsion angle of a torsion bar, which is executed by the torque detection device on the basis of an output from a magnetic sensor.

SUMMARY OF THE INVENTION

The invention provides a torque detection device that is configured to suppress deformation of a magnetic shield, and an electric power steering system (EPS) that includes the torque detection device.

According to a feature of an example of the invention, when a sensor housing is formed by supplying resin onto an outer periphery of a holder, the resin for forming the sensor housing flows into a through-hole, which is formed in the holder, through a resin flow passage of the holder, and the resin flow passage and the through-hole of the holder are filled with the resin.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
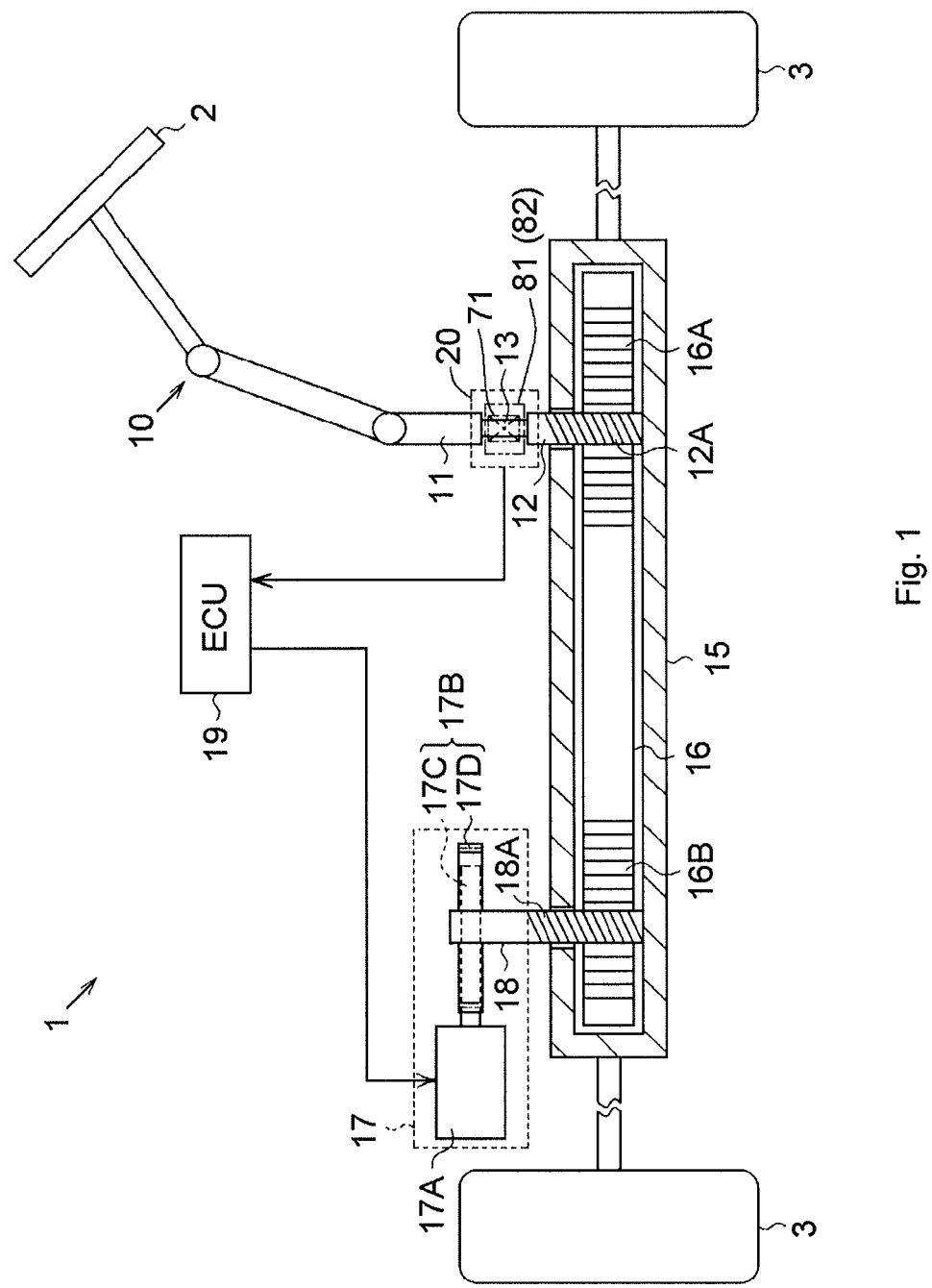
FIG. 1 is a view that schematically shows the overall structure of an electric power steering system (EPS) according to an embodiment of the invention.

The overall configuration of an electric power steering system (hereinafter, referred to as "EPS") 1 will be described with reference to FIG. 1. The EPS 1 includes a steering shaft 10, a rack shaft 16, a rack housing 15, and a torque detection device 20. The steering shaft 10 is connected to a steering wheel 2. The rack shaft 16 is connected to the steering shaft 10 and steered wheels 3. The rack housing 15 accommodates the rack shaft 16. The torque detection device 20 is used to detect a torque applied to the steering shaft 10 (hereinafter, referred to as "steering torque"). In addition, the EPS 1 includes an assist device 17, a pinion shaft 18, and an electronic control unit (ECU) 19. The assist device 17 applies force that assists an operation of the steering wheel 2 on the basis of a steering torque (hereinafter, referred to as "assist force"). The pinion shaft 18 transmits assist force to the rack shaft 16. The ECU 19 executes drive control on the assist device 17.

The rack shaft 16 has a first gear portion 16A and a second gear portion 16B. The first gear portion 16A is formed at a portion on the steering shaft 10 side in the axial direction of the rack shaft 16. The second gear portion 16B is formed at a portion on the assist device 17 side in the axial direction of the rack shaft 16.

The steering shaft 10 has a first shaft 11, a second shaft 12, and a torsion bar 13. The first shaft 11 rotates in accordance with the rotation of the steering wheel 2. The second shaft 12 has a gear portion 12A that is in mesh with the first gear portion 16A of the rack shaft 16. The torsion bar 13 couples the first shaft 11 and the second shaft 12 to each other.

The assist device 17 includes an electric motor 17A and a speed reduction mechanism 17B. The electric motor 17A serves as a driving source. The speed reduction mechanism 17B reduces the speed of rotation of an output shaft of the electric motor 17A and transmits the rotation with a reduced speed to the pinion shaft 18. The speed reduction mechanism 17B includes a worm shaft 17C and a worm wheel 17D. The worm shaft 17C is connected to the output shaft of the electric motor 17A. The worm wheel 17D is in mesh with the worm shaft 17C. The worm wheel 17D is fixed to the pinion shaft 18. The pinion shaft 18 has a gear portion 18A that is in mesh with the second gear portion 16B of the rack shaft 16.

The torque detection device 20 detects a magnetic flux density that changes on the basis of a relative rotation position (angle) between a permanent magnet 71 that rotates together with the first shaft 11 and first and second magnetic yokes 81, 82 that rotate together with the second shaft 12. The relative rotation position is correlated with a torsion angle of the torsion bar 13. That is, as the relative rotation position (angle) increases, the torsion angle of the torsion bar 13 increases. The torque detection device 20 outputs the detected magnetic flux density to the ECU 19. The ECU 19 detects the steering torque on the basis of the detected magnetic flux density. Then, the ECU 19 outputs the detected steering torque to the assist device 17.

The directions in the EPS 1 are defined as follows with reference to FIG. 2.

(A) A direction along the rotation central axis of the first shaft 11 is referred to as "axial direction ZA".
(B) In the axial direction ZA, a direction from the second shaft 12 toward the first shaft 11 is referred to as "direction toward an upper side ZA1", and a direction from the first shaft 11 toward the second shaft 12 is referred to as "direction toward a lower side ZA2".
(C) A direction perpendicular to the axial direction ZA is referred to as "radial direction ZB".
(D) In the radial direction ZB, a direction toward the rotation central axis of the first shaft 11 is referred to as "direction toward a radially inner side ZB1", and a direction away from the rotation central axis of the first shaft 11 is referred to as "direction toward a radially outer side ZB2".
(E) A direction around the rotation central axis of the first shaft 11 is referred to as "circumferential direction ZC".

The configuration around the torque detection device 20 in the EPS 1 will be described with reference to FIG. 2. The EPS 1 includes a housing 14 and a bearing 23. The housing 14 holds the torque detection device 20. The bearing 23 supports the second shaft 12 such that the second shaft 12 is rotatable relative to the housing 14.

The housing 14 is fixed to an output shaft housing 24 that accommodates the second shaft 12. The output shaft housing 24 is integrated with the rack housing 15 shown in FIG. 1. The torsion bar 13 is twisted as the first shaft 11 rotates. Then, the torsion bar 13 transmits the rotation of the first shaft 11 to the second shaft 12. Therefore, the first shaft 11 and the second shaft 12 rotate relative to each other. The second shaft 12 and the torsion bar 13 are arranged coaxially with the first shaft 11.

The EPS 1 includes a seal member 21 and a seal member 22. The seal member 21 seals a clearance between the torque detection device 20 and the first shaft 11. The seal member 22 seals a clearance between the torque detection device 20 and the housing 14.

The operation of the EPS 1 will be described with reference to FIG. 1. A driver rotates the steering wheel 2 to apply steering torque to the first shaft 11 of the steering shaft 10. The first shaft 11 transmits steering torque to the second shaft 12 via the torsion bar 13. The second shaft 12 transmits steering torque to the rack shaft 16. The rack shaft 16 makes a linear reciprocating motion when the first gear portion 16A of the shaft 16 meshes with the gear portion 12A of the second shaft 12. Thus, the direction of the steered wheels 3 is changed. At this time, the assist device 17 applies assist force based on the steering torque to the rack shaft 16.

Figure 3:
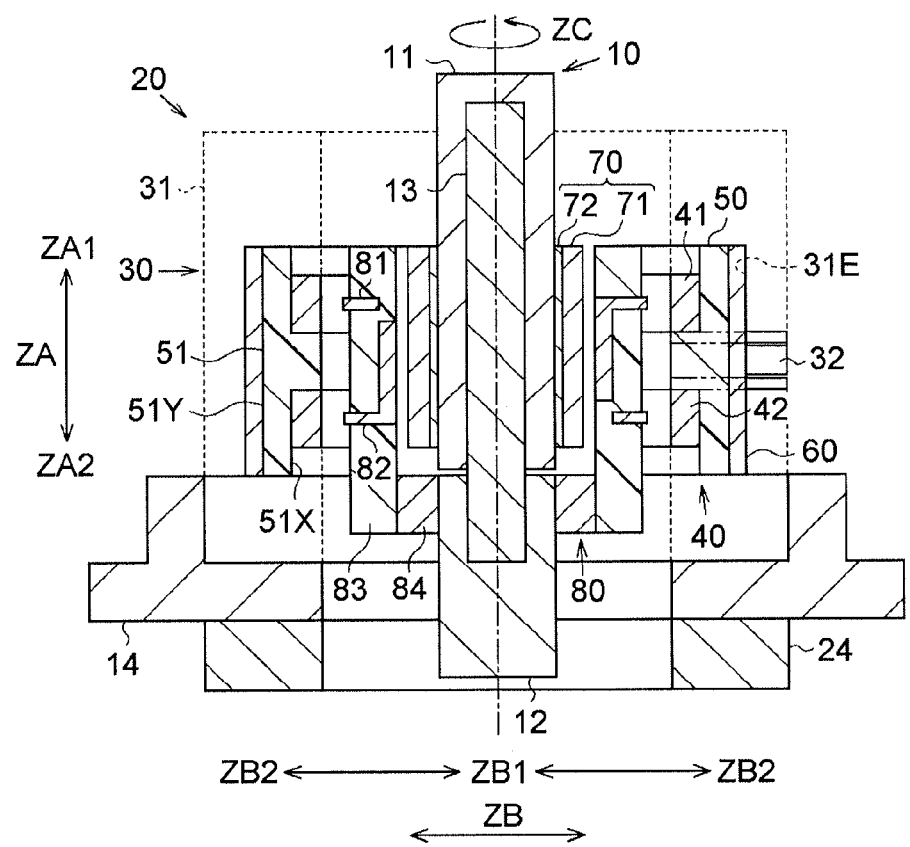
FIG. 3 is a view that schematically shows the positional relationship among components of a torque detection device according to the embodiment.

The configuration of the torque detection device 20 will be described with reference to FIG. 3. The torque detection device 20 includes a magnet unit 70, a magnetic yoke unit 80 and a sensor unit 30. The magnet unit 70 generates magnetic fluxes. The magnetic yoke unit 80 receives the magnetic fluxes generated by the magnet unit 70. The sensor unit 30 receives the magnetic fluxes from the magnetic yoke unit 80.

The magnet unit 70, the magnetic yoke unit 80 and the sensor unit 30 are arranged coaxially with one another. The magnet unit 70, the magnetic yoke unit 80 and the sensor unit 30 overlap with one another in the axial direction ZA. The magnetic yoke unit 80 covers the magnet unit 70 from the radially outer side ZB2. The sensor unit 30 covers the magnetic yoke unit 80 from the radially outer side ZB2.

The magnet unit 70 includes a cylindrical permanent magnet 71 and a core 72 that suppresses leakage of magnetic fluxes toward the radially inner side ZB1 of the permanent magnet 71. The permanent magnet 71 forms a magnetic field around the first shaft 11. The permanent magnet 71 is formed such that north poles and south poles are alternately arranged in the circumferential direction ZC (see FIG. 4A). The core 72 is press-fitted to the first shaft 11. The permanent magnet 71 is fixed to the core 72.

The magnetic yoke unit 80 includes the first magnetic yoke 81, the second magnetic yoke 82, a cylindrical yoke holder 83, and an intermediate member 84. The first magnetic yoke 81 and the second magnetic yoke 82 are arranged within the magnetic field that is formed by the permanent magnet 71. The yoke holder 83 holds the first magnetic yoke 81 and the second magnetic yoke 82. The yoke holder 83 is held on the second shaft 12 via the intermediate member 84.

An outer peripheral portion of the intermediate member 84 is press-fitted to the inner periphery of a lower end portion of the yoke holder 83. An inner peripheral portion of the intermediate member 84 is press-fitted to the outer periphery of an upper end portion of the second shaft 12. The yoke holder 83 is integrated with the first magnetic yoke 81 and the second magnetic yoke 82. The yoke holder 83 is manufactured as follows. The first magnetic yoke 81 and the second magnetic yoke 82 are arranged at prescribed positions inside a molding die (not shown), and then the yoke holder 83 is made of resin that is a molding material of the yoke holder 83 so as to be integrated with the magnetic yokes 81, 82.

The sensor unit 30 includes a sensor housing 31, two magnetic sensors 32, and a magnetic flux collecting unit 40. The sensor housing 31 is fitted to the housing 14 with a bolt (not shown). The magnetic sensors 32 each output a voltage corresponding to the magnetic flux density of the permanent magnet 71. The magnetic flux collecting unit 40 causes the magnetic fluxes of the permanent magnet 71 to interlink with each magnetic sensor 32. The voltage output from each magnetic sensor 32 is transmitted to the ECU 19 shown in FIG. 1. A Hall IC is used as each magnetic sensor 32.

The magnetic flux collecting unit 40 includes a first magnetic flux collecting ring 41, a second magnetic flux collecting ring 42, a holder 50, and a magnetic shield 60. The first magnetic flux collecting ring 41 collects magnetic fluxes from the first magnetic yoke 81. The second magnetic flux collecting ring 42 collects magnetic fluxes from the second magnetic yoke 82. The holder 50 holds the magnetic flux collecting rings 41, 42. The magnetic shield 60 reduces the influence of an external magnetic field on the magnetic yokes 81, 82 and the magnetic flux collecting rings 41, 42.

The first magnetic flux collecting ring 41 faces the outer peripheral portion of the first magnetic yoke 81 with a clearance left therebetween in the radial direction ZB. The second magnetic flux collecting ring 42 faces the outer peripheral portion of the second magnetic yoke 82 with a clearance left therebetween in the radial direction ZB. The magnetic shield 60 overlaps with the magnetic flux collecting rings 41, 42 in the axial direction ZA. The magnetic shield 60 covers the magnetic flux collecting rings 41, 42 from the radially outer side ZB2.

The holder 50 has a side wall 51 that forms an internal space in which the magnetic flux collecting rings 41, 42 are arranged. The side wall 51 has an annular shape of which the both sides in the axial direction ZA are open. The magnetic flux collecting rings 41, 42 are fixed to an inner periphery 51X of the side wall 51. The magnetic flux collecting rings 41, 42 each have an annular shape, and are arranged with a clearance left therebetween. Each of the magnetic flux collecting rings 41, 42 is formed by bending a long metal plate. The magnetic flux collecting rings 41, 42 are made of the same metal. The magnetic shield 60 is fixed to an outer periphery 51Y of the side wall 51.

Figure 2:
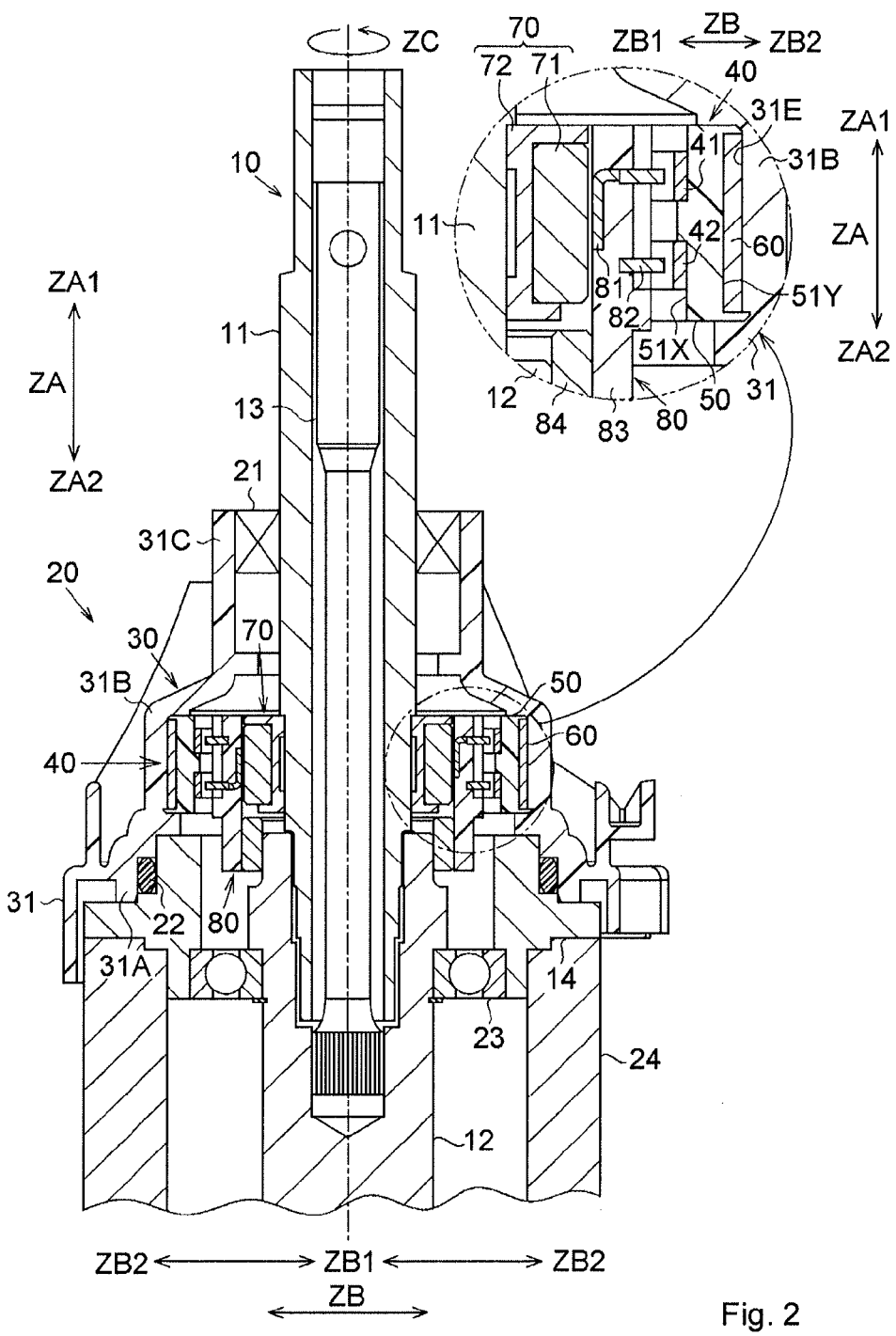
FIG. 2 is a sectional view that shows the sectional structure of a first shaft, taken along a plane that includes and extends along the rotation central axis of the first shaft in the EPS according to the embodiment.

As shown in FIG. 2, the sensor housing 31 has a fitting portion 31A, a cover portion 31B, and a mounting portion 31C. The fitting portion 31A is fitted to the housing 14. The cover portion 31B covers the holder 50 and the magnetic shield 60 from the radially outer side ZB2. The mounting portion 31C extends from the cover portion 31B toward the upper side ZA1. The seal member 21 is fixed to the mounting portion 31C.

Figure 4A:
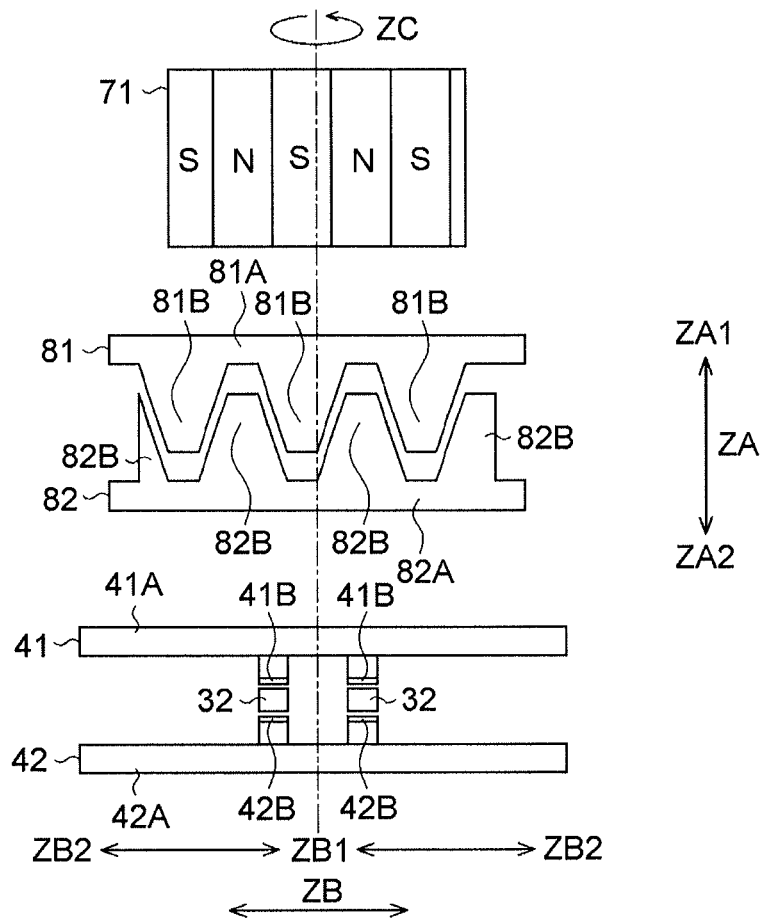
FIG. 4A is a front view that shows the front structures of a permanent magnet, magnetic yokes, magnetic flux collecting rings and magnetic sensors in the torque detection device according to the embodiment.
Figure 4B:
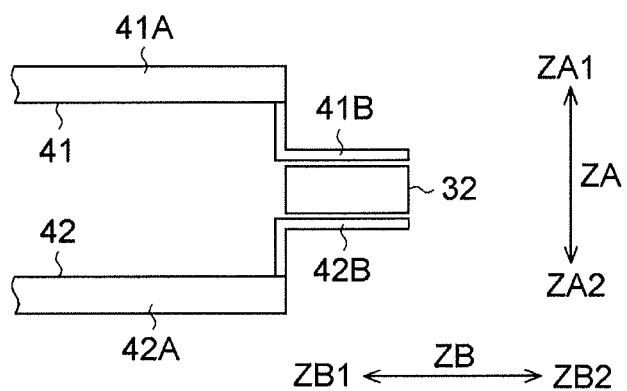
FIG. 4B is a side view that partially shows the side structures of the magnetic flux collecting rings and one of the magnetic sensors.

The detailed configuration of members through which the magnetic fluxes of the permanent magnet 71 flow will be described with reference to FIG. 4A and FIG. 4B. As shown in FIG. 4A, the first magnetic yoke 81 has a body ring 81A and a plurality of teeth 81B. The body ring 81A constitutes a main body of the first magnetic yoke 81. The teeth 81B extend from the body ring 81A toward the lower side ZA2. The inner periphery of the body ring 81A and the inner faces of the teeth 81B face the outer periphery of the permanent magnet 71.

The second magnetic yoke 82 has a body ring 82A and a plurality of teeth 82B. The body ring 82A constitutes a main body of the second magnetic yoke 82. The teeth 82B extend from the body ring 82A toward the upper side ZA1. The inner periphery of the body ring 81A and the inner faces of the teeth 82B face the outer periphery of the permanent magnet 71. The teeth 81B and the teeth 82B are alternately located in the circumferential direction ZC.

The first magnetic flux collecting ring 41 has a ring body 41A and two magnetic flux collecting protrusions 41B. The ring body 41A constitutes a main body of the first magnetic flux collecting ring 41. The magnetic flux collecting protrusions 41B face the upper faces of the respective magnetic sensors 32. As shown in FIG. 4B, the magnetic flux collecting protrusions 41B are formed by bending so as to extend from the ring body 41A toward the radially outer side ZB2.

The second magnetic flux collecting ring 42 has a ring body 42A and two magnetic flux collecting protrusions 42B. The ring body 42A constitutes a main body of the second magnetic flux collecting ring 42. The magnetic flux collecting protrusions 42B face the lower faces of the respective magnetic sensors 32. The magnetic flux collecting protrusions 42B are formed by bending so as to extend from the ring body 42A toward the radially outer side ZB2.

The operation of the torque detection device 20 will be described with reference to FIG. 5 to FIG. 7. In the body ring 81A of the first magnetic yoke 81, each portion that connects adjacent two teeth 81B in the circumferential direction ZC to each other is referred to as a connecting portion 81C. In addition, in the body ring 82A of the second magnetic yoke 82, each portion that connects adjacent two teeth 82B in the circumferential direction ZC to each other is referred to as a connecting portion 82C.

Figure 5:
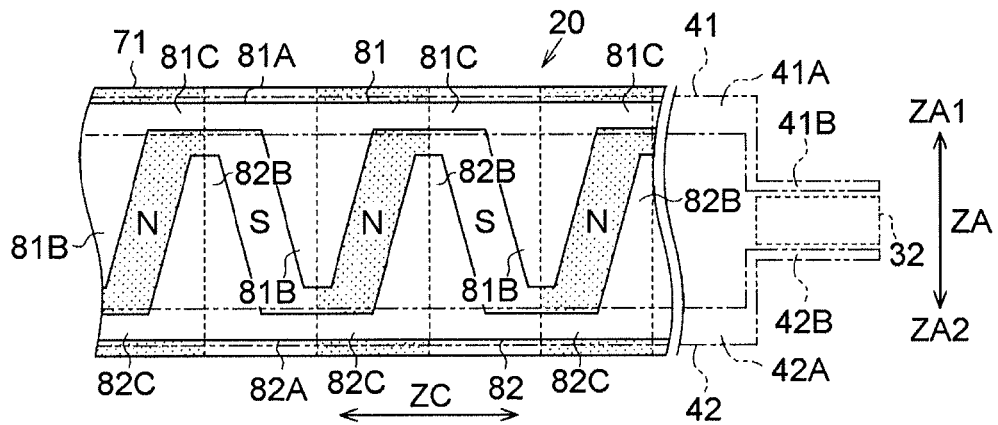
FIG. 5 is a development plan of the sectional structures of the permanent magnet and magnetic yokes, shown in FIG. 2, in the torque detection device according to the embodiment, and is a development plan that shows a state where an area at which the first magnetic yoke faces the north poles of the permanent magnet is equal to an area at which the second magnetic yoke faces the north poles of the permanent magnet.
Figure 6:
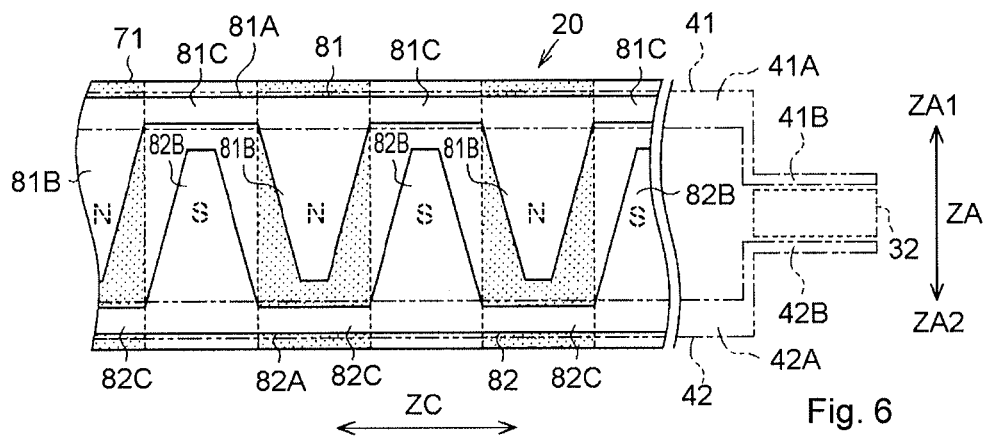
FIG. 6 is a development plan of the sectional structures of the permanent magnet and magnetic yokes, shown in FIG. 2, in the torque detection device according to the embodiment, and is a development plan that shows a state where the area at which the first magnetic yoke faces the north poles of the permanent magnet is larger than the area at which the second magnetic yoke faces the north poles of the permanent magnet.
Figure 7:
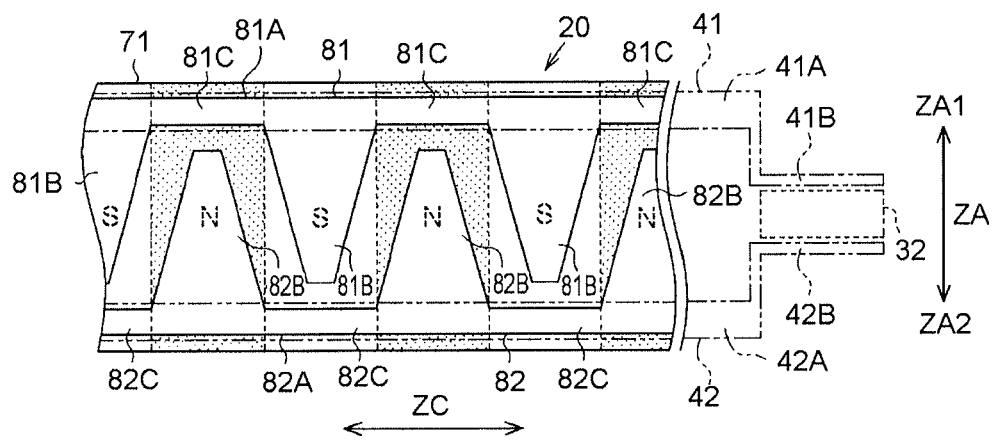
FIG. 7 is a development plan of the sectional structures of the permanent magnet and magnetic yokes, shown in FIG. 2, in the torque detection device according to the embodiment, and is a development plan that shows a state where the area at which the first magnetic yoke faces the north poles of the permanent magnet is smaller than the area at which the second magnetic yoke faces the north poles of the permanent magnet.

The torque detection device 20 has a first detection state shown in FIG. 5, a second detection state shown in FIG. 6 and a third detection state shown in FIG. 7 as detection states that are defined by the relationship between the area of a portion of the inner face of the first magnetic yoke 81, which faces each magnetic pole of the permanent magnet 71, and the area of a portion of the inner face of the second magnetic yoke 82, which faces the magnetic pole of the permanent magnet 71.

The detection state of the torque detection device 20 changes in accordance with the rotation of the steering shaft 10. That is, when the rotational position of the steering shaft 10 is a neutral position, that is, when the torsion angle of the torsion bar 13 is "0°", the detection state of the torque detection device 20 is the first detection state. When the rotational position of the steering shaft 10 is a position at which the steering shaft 10 has been rotated in a forward rotation direction from the neutral position to an upper limit within the rotation range of the steering shaft 10, the detection state of the torque detection device 20 is the second detection state. When the rotational position of the steering shaft 10 is a position at which the steering shaft 10 has been rotated in a direction opposite to the forward rotation direction from the neutral position to an upper limit within the rotation range of the steering shaft 10, the detection state of the torque detection device 20 is the third detection state.

Here, the area of each of the magnetic yokes 81, 82 is defined as follows.

(a) A first body north pole facing area RNA indicates the area of the inner faces of the connecting portions 81C of the first magnetic yoke 81, which face the north poles of the permanent magnet 71.
(b) A first teeth north pole facing area RNB indicates the area of the inner faces of the teeth 81B of the first magnetic yoke 81, which face the north poles of the permanent magnet 71.
(c) A first body south pole facing area RSA indicates the area of the inner faces of the connecting portions 81C of the first magnetic yoke 81, which face the south poles of the permanent magnet 71.
(d) A first teeth south pole facing area RSB indicates the area of the inner faces of the teeth 81B of the first magnetic yoke 81, which face the south poles of the permanent magnet 71.
(e) A second body north pole facing area SNA indicates the area of the inner faces of the connecting portions 82C of the second magnetic yoke 82, which face the north poles of the permanent magnet 71.
(f) A second teeth north pole facing area SNB indicates the area of the inner faces of the teeth 82B of the second magnetic yoke 82, which face the north poles of the permanent magnet 71.
(g) A second body south pole facing area SSA indicates the area of the inner faces of the connecting portions 82C of the second magnetic yoke 82, which face the south poles of the permanent magnet 71.
(h) A second teeth south pole facing area SSB indicates the area of the inner faces of the teeth 82B of the second magnetic yoke 82, which face the south poles of the permanent magnet 71.

The magnitude of magnetic fluxes that interlink with the magnetic sensors 32 changes depending on the detection state of the torque detection device 20. The flow of magnetic fluxes in each of the first detection state, second detection state and third detection state of the torque detection device 20 will be described below.

In the first detection state shown in FIG. 5, the north poles of the permanent magnet 71 face part of the connecting portions 81C and part of the teeth 81B of the first magnetic yoke 81. In addition, the north poles of the permanent magnet 71 face part of the connecting portions 82C and part of the teeth 82B of the second magnetic yoke 82. The south poles of the permanent magnet 71 face the other part of the connecting portions 81C and the other part of the teeth 81B of the first magnetic yoke 81. In addition, the south poles of the permanent magnet 71 face the other part of the connecting portions 82C and the other part of the teeth 82B of the second magnetic yoke 82. The permanent magnet 71 and the first magnetic yoke 81 form the following magnetic circuit. That is, part of the connecting portions 81C and part of the teeth 81B, which face the north poles of the permanent magnet 71, receive magnetic fluxes from the north poles of the permanent magnet 71. In the first magnetic yoke 81, through the other part of the connecting portions 81C and the other part of teeth 81B, which face the south poles of the permanent magnet 71, magnetic fluxes flow to the south poles of the permanent magnet 71. The permanent magnet 71 and the second magnetic yoke 82 form the following magnetic circuit. That is, part of the connecting portions 82C and part of the teeth 82B, which the north poles of the permanent magnet 71, receive magnetic fluxes from the north poles of the permanent magnet 71. In the second magnetic yoke 82, through the other part of the connecting portions 82C and the other part of the teeth 82B, which face the south poles of the permanent magnet 71, magnetic fluxes flow to the south poles of the permanent magnet 71.

In the first magnetic yoke 81, the first body north pole facing area RNA is equal to the first body south pole facing area RSA. In addition, the first teeth north pole facing area RNB is equal to the first teeth south pole facing area RSB. That is, in the first magnetic yoke 81, the area of the inner faces of the portions that face the north poles of the permanent magnet 71 is equal to the area of the inner faces of the portions that face the south poles of the permanent magnet 71.

Therefore, with regard to the magnetic fluxes that flow between one of the north poles of the permanent magnet 71 and one of the south poles, which is adjacent to the one of the north poles, the magnitude of magnetic fluxes that flow between the first magnetic yoke 81 and the north pole of the permanent magnet 71 is equal to the magnitude of magnetic fluxes that flow between the first magnetic yoke 81 and the south pole of the permanent magnet 71. Therefore, in the first magnetic yoke 81, magnetic fluxes that are received from the north poles of the permanent magnet 71 are in balance with magnetic fluxes that flow to the south poles of the permanent magnet 71.

In addition, in the second magnetic yoke 82, the second body north pole facing area SNA is equal to the second body south pole facing area SSA. The second teeth north pole facing area SNB is equal to the second teeth south pole facing area SSB. Therefore, as in the first magnetic yoke 81, in the second magnetic yoke 82, magnetic fluxes that are received from the north poles of the permanent magnet 71 are in balance with magnetic fluxes that flow through the south poles of the permanent magnet 71.

In the first detection state, the flow of magnetic fluxes between the first magnetic yoke 81 and the permanent magnet 71 is in balance with the flow of magnetic fluxes between the second magnetic yoke 82 and the permanent magnet 71, as described above. Therefore, magnetic fluxes do not flow between the first magnetic yoke 81 and the second magnetic yoke 82, that is, between the first magnetic flux collecting ring 41 and the second magnetic flux collecting ring 42. Therefore, the voltage output from each magnetic sensor 32 is "0 V".

In the second detection state shown in FIG. 6, the north poles of the permanent magnet 71 face the entirety of the teeth 81B of the first magnetic yoke 81. In addition, the north poles of the permanent magnet 71 face the entirety of the connecting portions 82C of the second magnetic yoke 82. The south poles of the permanent magnet 71 face the entirety of the connecting portions 81C of the first magnetic yoke 81. In addition, the south poles of the permanent magnet 71 face the entirety of the connecting portions 82C of the second magnetic yoke 82. The permanent magnet 71 and the first magnetic yoke 81 form the following magnetic circuit. That is, the teeth 81B receive magnetic fluxes from the north poles of the permanent magnet 71. Through the connecting portions 81C, magnetic fluxes flow to the south poles of the permanent magnet 71. The permanent magnet 71 and the second magnetic yoke 82 form the following magnetic circuit. That is, the connecting portions 82C receive magnetic fluxes from the north poles of the permanent magnet 71. Through the teeth 82B, magnetic fluxes flow to the south poles of the permanent magnet 71.

In the first magnetic yoke 81, the first body north pole facing area RNA and the first teeth south pole facing area RSB each are "0". The first teeth north pole facing area RNB is larger than the first body south pole facing area RSA.

Therefore, magnetic fluxes that flow between the first magnetic yoke 81 and one of the north poles of the permanent magnet 71 is larger than magnetic fluxes that flow between the first magnetic yoke 81 and one of the south poles of the permanent magnet 71. Therefore, the magnetic fluxes of the north poles of the permanent magnet 71 pass through the first magnetic yoke 81. Therefore, the first magnetic yoke 81 is magnetized as a south pole.

In the second magnetic yoke 82, the second body south pole facing area SSA and the second teeth north pole facing area SNB each are "0". The second teeth south pole facing area SSB is larger than the second body north pole facing area SNA. Therefore, the second magnetic yoke 82 is magnetized as a north pole.

In the second detection state, magnetic fluxes pass through the first magnetic yoke 81 as described above, and the second magnetic yoke 82 is magnetized as a north pole. Therefore, magnetic fluxes of the north poles of the permanent magnet 71 sequentially flow through the first magnetic yoke 81, the first magnetic flux collecting ring 41, the second magnetic flux collecting ring 42, the second magnetic yoke 82 and the south poles of the permanent magnet 71. Therefore, each magnetic sensor 32 outputs a voltage corresponding to the magnitude and the direction of magnetic fluxes that interlink with the magnetic sensor 32. The ECU 19 calculates the steering torque on the basis of the voltage output from each magnetic sensor 32.

In the third detection state shown in FIG. 7, the north poles of the permanent magnet 71 face the entirety of the connecting portions 81C of the first magnetic yoke 81. In addition, the north poles of the permanent magnet 71 face the entirety of the teeth 82B of the second magnetic yoke 82. The south poles of the permanent magnet 71 face the entirety of the teeth 81B of the first magnetic yoke 81. In addition, the south poles of the permanent magnet 71 face the entirety of the connecting portions 82C of the second magnetic yoke 82. The permanent magnet 71 and the first magnetic yoke 81 form the following magnetic circuit. That is, the connecting portions 81C receive magnetic fluxes from the north poles of the permanent magnet 71. Through the teeth 81B, magnetic fluxes flow to the south poles of the permanent magnet 71. The permanent magnet 71 and the second magnetic yoke 82 form the following magnetic circuit. That is, the teeth 82B receive magnetic fluxes from the north poles of the permanent magnet 71. Through the connecting portions 82C, magnetic fluxes flow to the south poles of the permanent magnet 71.

In the first magnetic yoke 81, the first body south pole facing area RSA and the first teeth north pole facing area RNB each are "0". The first teeth south pole facing area RSB is larger than the first body north pole facing area RNA. Therefore, the first magnetic yoke 81 is magnetized as a north pole.

In the second magnetic yoke 82, the second body north pole facing area SNA and the second teeth south pole facing area SSB each are "0". The second teeth north pole facing area SNB is larger than the second body south pole facing area SSA.

Therefore, magnetic fluxes that flow between the second magnetic yoke 82 and one of the north poles of the permanent magnet 71 is larger than magnetic fluxes that flow between the second magnetic yoke 82 and one of the south poles of the permanent magnet 71. Therefore, the magnetic fluxes of the north poles of the permanent magnet 71 pass through the second magnetic yoke 82.

In the third detection state, magnetic fluxes pass through the second magnetic yoke 82 as described above, and the first magnetic yoke 81 is magnetized as a north pole. Therefore, magnetic fluxes of the north poles of the permanent magnet 71 sequentially flow through the second magnetic yoke 82, the second magnetic flux collecting ring 42, the first magnetic flux collecting ring 41, the first magnetic yoke 81 and the south poles of the permanent magnet 71. Therefore, each magnetic sensor 32 outputs a voltage corresponding to the magnitude and the direction of magnetic fluxes that interlink with the magnetic sensor 32. The ECU 19 calculates the steering torque on the basis of the voltage output from each magnetic sensor 32.

Figure 8A:
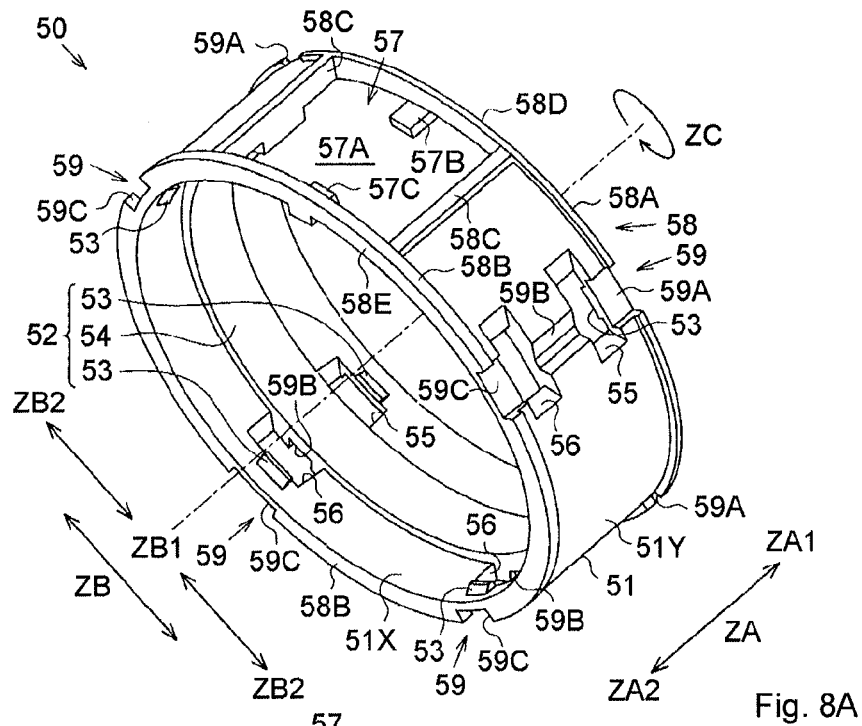
FIG. 8A is a perspective view that shows the perspective structure of a holder in the torque detection device according to the embodiment.
Figure 8B:
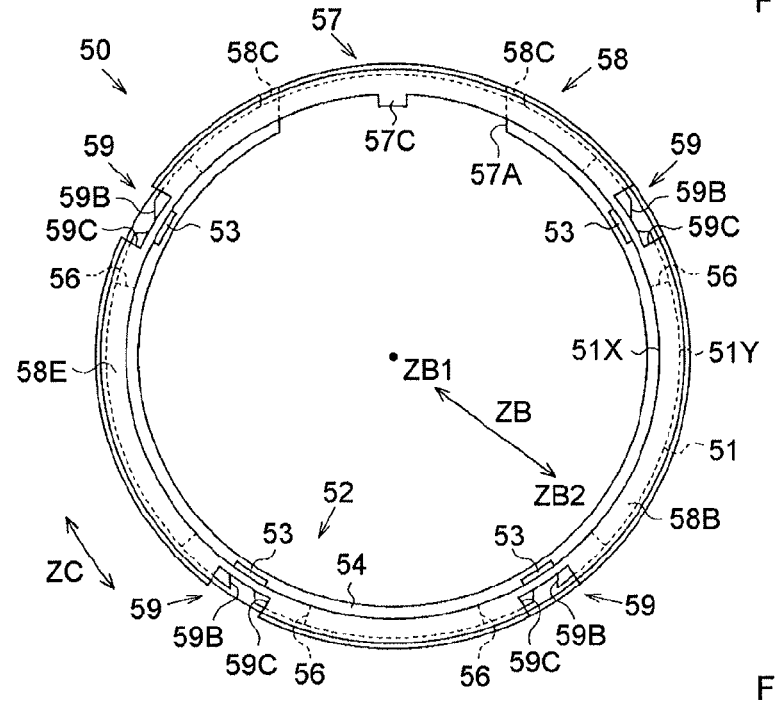
FIG. 8B is a bottom view that shows the bottom structure of the holder.

The detailed configuration of the holder 50 will be described with reference to FIG. 8A and FIG. 8B. The holder 50 has a holding protrusion 52 that holds the first magnetic flux collecting ring 41 and the second magnetic flux collecting ring 42. The holding protrusion 52 is formed on the inner periphery 51X of the side wall 51. The holding protrusion 52 has a plurality of first holding portions 53 and a second holding portion 54. The first holding portions 53 hold the first magnetic flux collecting ring 41 and the second magnetic flux collecting ring 42. The second holding portion 54 holds the first magnetic flux collecting ring 41 and the second magnetic flux collecting ring 42 from the sides opposite to the first holding portions 53 in the axial direction ZA. The holder 50 has upper through-holes 55, lower through-holes 56, an insertion portion 57, a shield holding portion 58 and resin flow passages 59. The upper through-holes 55 and the lower through-holes 56 extend through the side wall 51 in the radial direction ZB. The magnetic flux collecting protrusions 41B of the first magnetic flux collecting ring 41 and the magnetic flux collecting protrusions 42B of the second magnetic flux collecting ring 42 are inserted into the insertion portion 57. The shield holding portion 58 holds the magnetic shield 60. Resin, which is a molding material of the sensor housing 31, is supplied to the resin flow passages 59 at the time of forming the sensor housing 31.

The first holding portions 53 and the second holding portion 54 protrude from the inner periphery 51X of the side wall 51 toward the radially inner side ZB1. The first holding portions 53 are formed on the inner periphery 51X of the side wall 51 at portions on the upper side ZA1 and lower side ZA2 with respect to the second holding portion 54.

Each upper through-hole 55 is formed in the side wall 51 at a position next to the holding protrusion 52, that is, a position, in the axial direction ZA, between a portion from which the upper first holding portion 53 protrudes and a portion from which the second holding portion 54 protrudes. Each lower through-hole 56 is formed in the side wall 51 at a position next to the holding protrusion 52, that is, a position, in the axial direction ZA, between a portion from which the lower first holding portion 53 protrudes and a portion from which the second holding portion 54 protrudes.

The shield holding portion 58 has an upper wall 58A, a lower wall 58B and end walls 58C. The upper wall 58A supports the magnetic shield 60 from the upper side ZA1. The lower wall 58B supports the magnetic shield 60 from the lower side ZA2. The end walls 58C restrict movement of the magnetic shield 60 in the circumferential direction ZC with respect to the holder 50. An upper end face 58D of the upper wall 58A defines an opening of the inner space formed on the inner side of the side wall 51, the opening being on the upper side ZA1. A lower end face 58E of the lower wall 58B defines an opening of the inner space formed on the inner side of the side wall 51, the opening being on the lower side ZA2.

The insertion portion 57 has an insertion hole 57A, an upper protrusion 57B and a lower protrusion 57C. The magnetic flux collecting protrusion 41B and the magnetic flux collecting protrusion 42B are inserted into the insertion hole 57A. The upper protrusion 57B determines the position of the first magnetic flux collecting ring 41 with respect to the holder 50 in the circumferential direction ZC. The lower protrusion 57C determines the position of the second magnetic flux collecting ring 42 with respect to the holder 50 in the circumferential direction ZC.

The resin flow passages 59 are formed in the outer periphery 51Y of the side wall 51 at portions that correspond to the upper through-holes 55 and the lower through-holes 56. Each resin flow passage 59 has an upper flow passage 59A, an intermediate flow passage 59B and a lower flow passage 59C. The upper flow passage 59A connects the upper end face 58D of the upper wall 58A and the upper through-hole 55 to each other. The intermediate flow passage 59B connects the upper through-hole 55 and the lower through-hole 56 to each other. The lower flow passage 59C connects the lower through-hole 56 and the lower end face 58E of the lower wall 58B to each other.

Each upper flow passage 59A has a linear shape so as to extend in the axial direction ZA from the upper end face of a portion of the upper wall 58A, which corresponds to the upper through-hole 55 in the circumferential direction ZC, toward the upper through-hole 55. Each lower flow passage 59C has a linear shape so as to extend in the axial direction ZA from the lower end face of a portion of the lower wall 58B, which corresponds to the lower through-hole 56 in the circumferential direction ZC, toward the lower through-hole 56. Each intermediate flow passage 59B has a linear shape so as to extend in the axial direction ZA.

The flow passages 59A, 59B and 59C have the following relationship.
(A) The center of the upper flow passage 59A in the circumferential direction ZC, the center of the intermediate flow passage 59B in the circumferential direction ZC, the center of the lower flow passage 59C in the circumferential direction ZC, the center portion of the upper through-hole 55 in the circumferential direction ZC, and the center portion of the lower through-hole 56 in the circumferential direction ZC coincide with each other.
(B) The size of the upper flow passage 59A in the circumferential direction ZC is equal to the size of the lower flow passage 59C in the circumferential direction ZC.
(C) The size of the intermediate flow passage 59B in the circumferential direction ZC is smaller than each of the size of the upper flow passage 59A in the circumferential direction ZC and the size of the lower flow passage 59C in the circumferential direction ZC.
(D) The size of the upper flow passage 59A in the axial direction ZA is equal to the size of the lower flow passage 59C in the axial direction ZA.
(E) The size of the intermediate flow passage 59B in the axial direction ZA is larger than each of the size of the upper flow passage 59A in the axial direction ZA and the size of the lower flow passage 59C in the axial direction ZA.

Figure 9A:
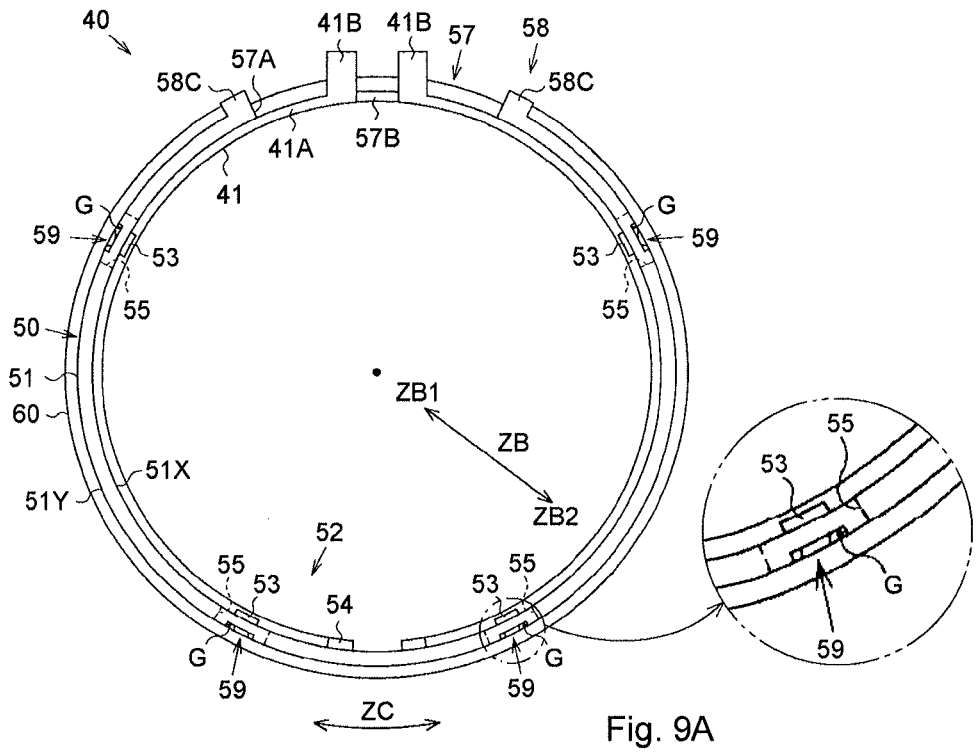
FIG. 9A is a plan view that shows the planar structure of a magnetic flux collecting unit in the torque detection device according to the embodiment.
Figure 9B:
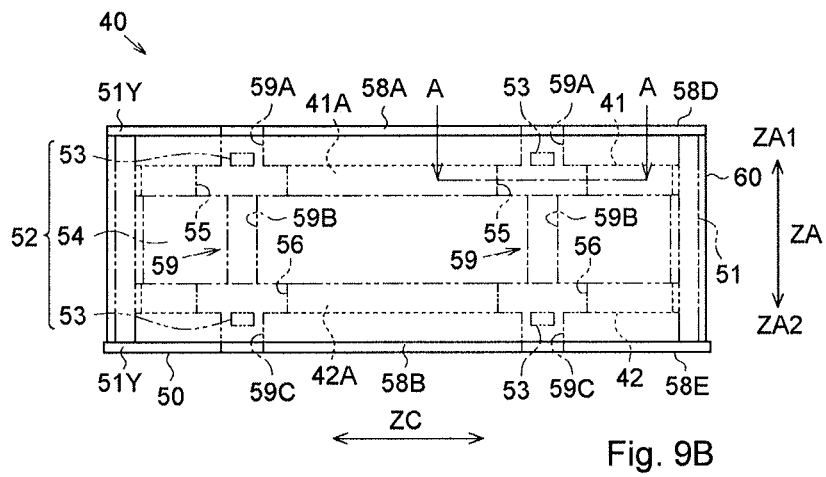
FIG. 9B is a front view that shows the front structure of the magnetic flux collecting unit.

The detailed configuration of the magnetic flux collecting unit 40 will be described with reference to FIG. 9A and FIG. 9B. FIG. 9A shows the planar structure of the magnetic flux collecting unit 40 in a state where the upper wall 58A and the lower wall 58B are omitted from the holder 50. FIG. 9B shows the front structure of the magnetic flux collecting unit 40.

The ring body 41A of the first magnetic flux collecting ring 41 is held between the upper-side first holding portions 53 and the second holding portion 54 in the width direction of the ring body 41A. The upper protrusion 57B of the holder 50 is inserted between the magnetic flux collecting protrusions 41B in the circumferential direction ZC. The ring body 41A covers the upper through-holes 55.

The ring body 42A of the second magnetic flux collecting ring 42 is held between the lower-side first holding portions 53 and the second holding portion 54 in the width direction of the ring body 42A. The lower protrusion 57C (see FIG. 8A) of the holder 50 is inserted between the magnetic flux collecting protrusions 42B shown in FIG. 4A in the circumferential direction ZC. The ring body 42A covers the lower through-holes 56.

The magnetic shield 60 is positioned by the end walls 58C of the holder 50 in the circumferential direction ZC. A clearance G is formed between the magnetic shield 60 and each resin flow passage 59. The clearance G is formed so as to extend from the upper end face of the upper wall 58A to the lower end face of the lower wall 58B in the side wall 51. The magnetic shield 60 covers the outer periphery 51Y of the side wall 51, and covers also the upper through-holes 55 and the lower through-holes 56.

A method of manufacturing the torque detection device 20 will be described below. Specifically, the manufacturing method includes the following step K1 to step K3. In step K1, the magnetic flux collecting unit 40 is assembled by fitting the magnetic flux collecting rings 41, 42 and the magnetic shield 60 to the holder 50. In step K2, the magnetic flux collecting unit 40 is arranged in the molding die (not shown) used to form the sensor housing 31. In step K3 that is executed subsequent to step K2, the sensor housing 31 is formed integrally with the magnetic flux collecting unit 40 by pouring resin, which is a molding material of the sensor housing 31, into the molding die from the outer peripheral side of the magnetic flux collecting unit 40. At this time, as shown in FIG. 2, the sensor housing 31 has an inner face 31E that is welded to the outer face of the side wall 51, that is, the upper end face 58D of the upper wall 58A and the lower end face 58E of the lower wall 58B (see FIG. 8A). The molding material of the sensor housing 31 is the same as the molding material of the holder 50.

Figure 10:
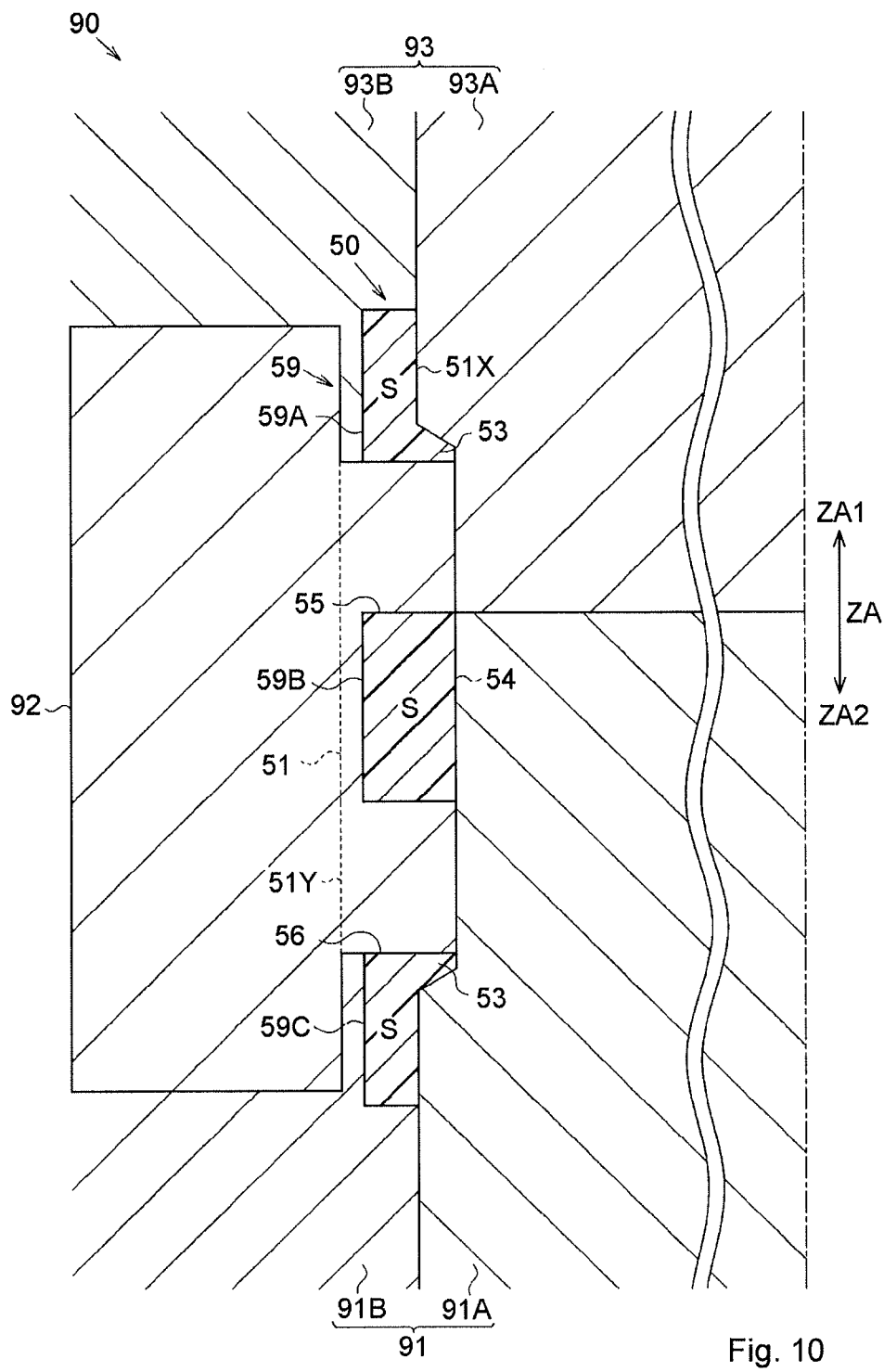
FIG. 10 is a sectional view that schematically shows the partial sectional structure of a molding die that is used to form the holder in the torque detection device according to the embodiment.

A method of manufacturing the holder 50 will be described with reference to FIG. 10. At the time of forming the holder 50, resin is poured into a space S inside a molding die 90. The space S corresponds to the shape of the holder 50.

The molding die 90 includes a stationary platen 93, a first movable platen 91 and a second movable platen 92. The stationary platen 93 has a gate (not shown) through which resin is supplied. The first movable platen 91 approaches or moves away from the stationary platen 93 in the axial direction ZA. The second movable platen 92 approaches or moves away from the first movable platen 91 and the stationary platen 93 in a direction along a plane perpendicular to the axial direction ZA.

The first movable platen 91 has an inner movable platen 91A and an outer movable platen 91B. The inner movable platen 91A is used to form the inner periphery 51X-side of the side wall 51 of the holder 50. The outer movable platen 91B is used to form the lower end face side and the outer periphery 51Y-side of the holder 50.

The stationary platen 93 has an inner stationary platen 93A and an outer stationary platen 93B. The inner stationary platen 93A is used to form the inner periphery 51X-side of the side wall 51 of the holder 50. The outer stationary platen 93B is used to form the upper end face side and the outer periphery 51Y-side of the holder 50.

The second movable platen 92 is located between the outer movable platen 91B and the outer stationary platen 93B in the axial direction ZA at the time of forming the holder 50. The stationary platen 93 and the second movable platen 92 are used to form a portion of the holder 50, which is on the upper side ZA1 with respect to the second holding portion 54. In addition, the stationary platen 93 and the second movable platen 92 are used to form the upper-side first holding portions 53 and the upper through-holes 55.

The first movable platen 91 and the second movable platen 92 are used to form the second holding portion 54 and a portion of the holder 50, which is on the lower side ZA2 with respect to the second holding portion 54. In addition, the first movable platen 91 and the second movable platen 92 are used to form the lower-side first holding portions 53 and the lower through-holes 56.

After the holder 50 is formed by supplying resin into the space S, the first movable platen 91 is moved away from the stationary platen 93 toward the lower side ZA2. The second movable platen 92 is moved away from the first movable platen 91 and the stationary platen 93 in a direction along a plane perpendicular to the axial direction ZA. The second movable platen 92 is moved in this way. As a result, the upper through-holes 55 and the lower through-holes 56 are formed.

Figure 11:
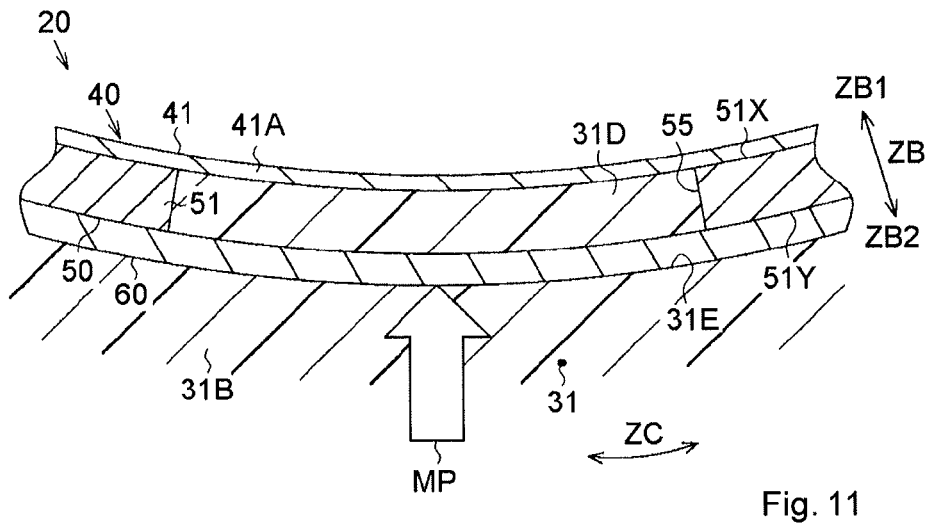
FIG. 11 is a sectional view that shows the sectional structure taken along the A-A plane in FIG. 9B in the torque detection device according to the embodiment.
Figure 12:
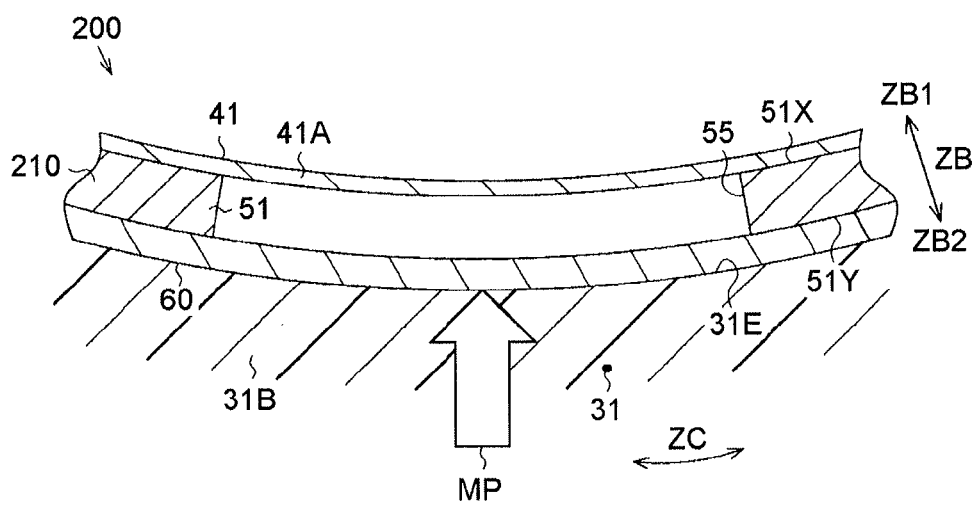
FIG. 12 is a sectional view that shows the partial sectional structure of a sensor unit in a torque detection device according to a comparative example.

The operation of the torque detection device 20 will be described on the basis of a comparison with a torque detection device (hereinafter, "comparative device 200") according to a comparative example, with reference to FIG. 11 and FIG. 12. FIG. 11 shows a sectional view taken along the line A-A in FIG. 9B. FIG. 12 shows a similar sectional view of the comparative example. The relationship between a portion of the magnetic shield 60, which corresponds to each upper through-hole 55, and the first magnetic flux collecting ring 41 will be described. The relationship between a portion of the magnetic shield 60, which corresponds to each lower through-hole 56, and the second magnetic flux collecting ring 42 is similar to the above, so the description thereof is omitted.

The comparative device 200 differs from the torque detection device 20 according to the present embodiment in that a holder 210 having a configuration that is obtained by omitting the resin flow passages 59 from the holder 50 is used instead of the holder 50, and the other configuration is similar to that of the torque detection device 20. Therefore, components that are the same as those of the torque detection device 20 will be denoted by the same reference numerals as those of the torque detection device 20, and the description thereof is omitted.

As shown in FIG. 12, in the comparative device 200, portions of the magnetic shield 60, which correspond to the upper through-holes 55 and the lower through-holes 56 (see FIG. 10) of the holder 210, are not supported by a molding die from the radially inner side. Therefore, when pressure (hereinafter, "resin pressure MP") applied from resin poured into the molding die in step K3 is high, these portions deform toward the holder 210. The deformed portions of the magnetic shield 60 contact or approach closely to the outer periphery of the first magnetic flux collecting ring 41. In this case, magnetic fluxes flow from the first magnetic flux collecting ring 41 shown in FIG. 4A to the magnetic shield 60. Accordingly, the amount of magnetic fluxes that interlink with the magnetic sensors 32 shown in FIG. 4A from the first magnetic flux collecting ring 41 changes. Therefore, the voltage output from the magnetic sensor 32 changes. Therefore, it is difficult for the ECU 19 to accurately calculate the steering torque on the basis of the voltage output from each magnetic sensor 32 of the comparative device 200.

As shown in FIG. 11, in the torque detection device 20, when the sensor housing 31 is formed, the resin for forming the sensor housing 31 is supplied to the upper through-holes 55 and the lower through-holes 56 via the clearances G (see FIG. 9A) between the magnetic shield 60 and the holder 50, which are formed by the resin flow passages 59. Therefore, the sensor housing 31 has filling portions 31D with which the resin flow passages 59, the upper through-holes 55 and the lower through-holes 56 are filled. Thus, the filling portions 31D are interposed between the first magnetic flux collecting ring 41 and the magnetic shield 60. Therefore, portions of the magnetic shield 60, which correspond to the upper through-holes 55 and lower through-holes 56 of the side wall 51, receive force from the resin on the outer face of the magnetic shield 60 and the resin on the inner face of the magnetic shield 60. Therefore, in comparison with the comparative device 200, the magnetic shield is less likely to deform toward the magnetic flux collecting rings. Thus, even when the magnetic shield 60 is deformed due to the resin pressure MP, the magnetic shield 60 is less likely to approach the first magnetic flux collecting ring 41. Therefore, the voltage output from each magnetic sensor 32 is less likely to change as compared with the comparative device 200. As a result, the ECU 19 is able to accurately calculate the steering torque.

The EPS 1 according to the present embodiment has the following advantageous effects.

(1) The side wall 51 of the holder 50 has the resin flow passages 59. The sensor housing 31 has the filling portions 31D. With this configuration, it is possible to suppress deformation of the magnetic shield 60 toward the first magnetic flux collecting ring 41 and the second magnetic flux collecting ring 42 through the upper through-holes 55 and the lower through-holes 56 due to the resin pressure MP. Thus, the magnetic shield 60 is less likely to approach the first magnetic flux collecting ring 41 or the second magnetic flux collecting ring 42. Therefore, in comparison with the comparative device 200, the ECU 19 is able to accurately calculate the steering torque.

(2) The resin flow passages 59 have the upper flow passages 59A that are formed in a linear shape so as to extend from the upper end faces of portions of the upper wall 58A, which correspond to the upper through-holes 55 in the circumferential direction ZC, toward the upper through-holes 55. With this configuration, in comparison with the case where the upper flow passages 59A each have a curved shape or a bent shape, the upper flow passages 59A are short. Therefore, at the time of forming the sensor housing 31, resin for forming the sensor housing 31 easily flows from the upper wall 58A of the side wall 51 to the upper through-holes 55 through the upper flow passages 59A.

(3) The resin flow passages 59 each have the intermediate flow passage 59B that connects the upper through-hole 55 and the lower through-hole 56 to each other. With this configuration, resin for forming the sensor housing 31 flows into the upper through-holes 55 and then flows into the lower through-holes 56 through the intermediate flow passages 59B. Therefore, in comparison with a configuration that includes a resin flow passage that connects the upper wall 58A to the lower through-holes 56, it is possible to simplify the shape of the holder 50.

(4) Water may adhere to the rack housing 15 while the vehicle is travelling. Therefore, when the torque detection device 20 is arranged at a position next to the rack housing 15, water may adhere to the torque detection device 20 while the vehicle is travelling. However, the torque detection device 20 includes the sensor housing 31 that is formed integrally with the magnetic flux collecting unit 40 by supplying resin onto the outer periphery of the magnetic flux collecting unit 40. With this configuration, it is possible to suppress entry of water between the magnetic flux collecting unit 40 and the sensor housing 31.

Hereinafter, modified examples of the above-described embodiment will be described as other embodiments of the invention. Note that the following modified examples may be combined with each other.

The holder 50 in the above-described embodiment (FIG. 8A) has the upper flow passages 59A, the intermediate flow passages 59B and the lower flow passages 59C as the resin flow passages 59. Alternatively, the holder 50 according to a modified example may have the following resin flow passages described in (A) to (C).

Figure 13A:
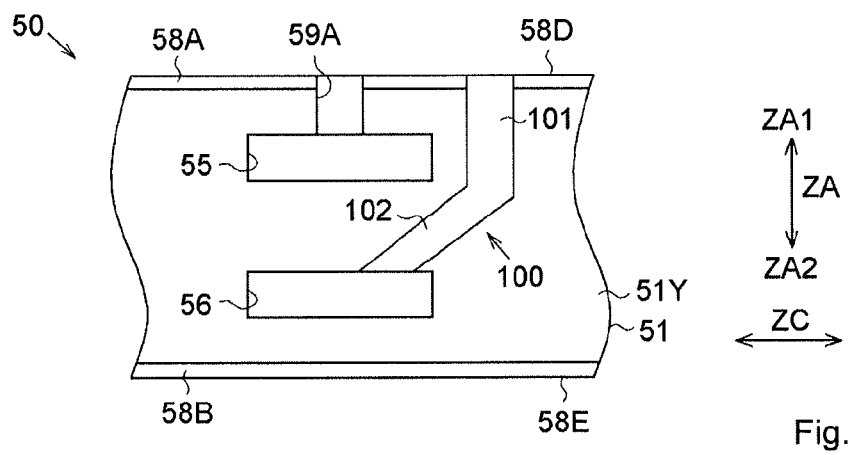
FIG. 13A to FIG. 13C are side views that schematically show the partial side structures of holders in torque detection devices according to other embodiments of the invention.

(A) As shown in FIG. 13A, the holder 50 according to the modified example has upper flow passages 59A and resin flow passages 100 formed in the outer periphery 51Y of the side wall 51. Each resin flow passage 100 extends from the upper end face of a portion of the upper wall 58A, which is offset from the upper through-hole 55 in the circumferential direction ZC, toward the lower through-hole 56. Each resin flow passage 100 has a first flow passage 101 and a second flow passage 102. The first flow passage 101 extends from the upper end face of the upper wall 58A toward the lower side ZA2. The second flow passage 102 extends from the lower end of the first flow passage 101 toward the lower through-hole 56. In a direction toward the lower side ZA2, the second flow passage 102 is inclined toward the lower through-hole 56 in the circumferential direction ZC.

Figure 13B:
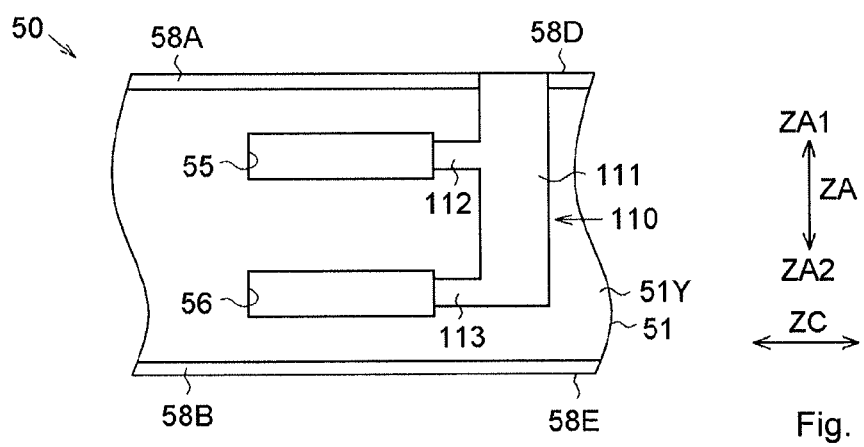

(B) As shown in FIG. 13B, the holder 50 according to another modified example has resin flow passages 110 formed in the outer periphery 51Y of the side wall 51. Each resin flow passage 110 has a first flow passage 111, a second flow passage 112, and a third flow passage 113. The first flow passage 111 extends from the upper end face of a portion of the upper wall 58A, which is offset from the upper through-hole 55 in the circumferential direction ZC, toward the lower side ZA2. The second flow passage 112 connects the first flow passage 111 and the upper through-hole 55 to each other. The third flow passage 113 connects the first flow passage 111 and the lower through-hole 56 to each other.

Figure 13C:
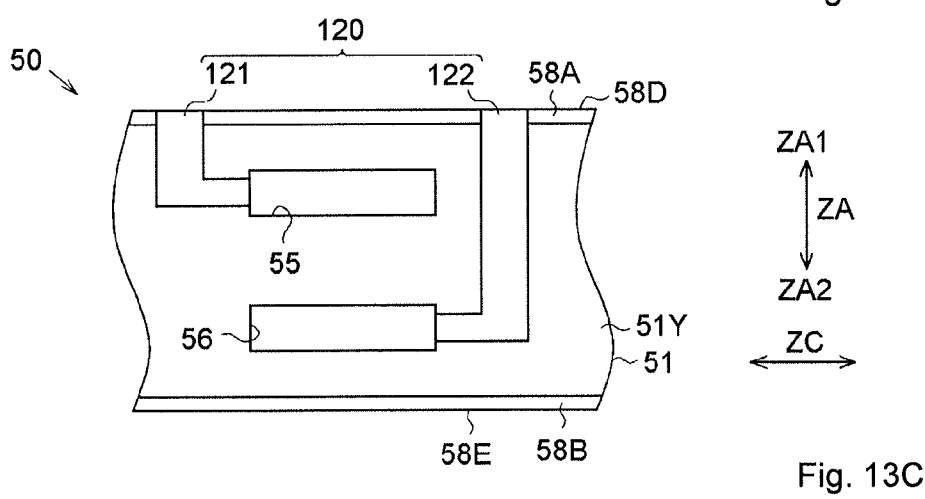

(C) As shown in FIG. 13C, the holder 50 according to another modified example has resin flow passages 120 formed in the outer periphery 51Y of the side wall 51. Each resin flow passage 120 has a first flow passage 121 and a second flow passage 122. The first flow passage 121 connects the upper end face of a portion of the upper wall 58A, which is offset from the upper through-hole 55 in the circumferential direction ZC, and the upper through-hole 55 to each other. The second flow passage 122 connects the upper end face of a portion of the upper wall 58A, which is offset from the upper through-hole 55 and the first flow passage 121 in the circumferential direction ZC, and the lower through-hole 56 to each other.

In the holders 50 described in (A) to (C), the intermediate flow passages 59B and the lower flow passages 59C are omitted. On the other hand, in the holder 50 according to a modified example, the holders 50 described in (A) to (C) may have at least one of a plurality of the intermediate flow passages 59B and a plurality of the lower flow passages 59C.

The holder 50 according to the above-described embodiment (FIG. 8A) has the lower flow passages 59C. Alternatively, in the holder 50 according to a modified example, the lower flow passages 59C may be omitted.

The holder 50 according to the above-described embodiment (FIG. 8A) has the resin flow passages 59 that are formed in a linear shape and formed in the outer periphery 51Y of the side wall 51. Alternatively, in the holder 50 according to a modified example, the resin flow passages 59 having a curved shape or a bent shape may be formed in the inner periphery 51X of the side wall 51.

In the holder 50 according to the above-described embodiment (FIG. 8A), the upper flow passages 59A and the lower flow passages 59C are formed at the same portions in the circumferential direction ZC as the upper through-holes 55 and the lower through-holes 56 in the side wall 51. Alternatively, in the holder 50 according to a modified example, at least one of a plurality of the upper flow passages 59A and a plurality of the lower flow passages 59C may be formed at portions of the side wall 51, which are offset from the upper through-holes 55 or the lower through-holes 56 in the circumferential direction ZC.

The torque detection device 20 according to the above-described embodiment (FIG. 4A) has the two magnetic sensors 32. Alternatively, the torque detection device 20 according to a modified example may have the single magnetic sensor 32. In this case, the first magnetic flux collecting ring 41 has the single magnetic flux collecting protrusion 41B. The second magnetic flux collecting ring 42 has the single magnetic flux collecting protrusion 42B. The torque detection device 20 according to a modified example may have a magnetic detection element, such as a Hall element and an MR element, as the magnetic sensor 32, instead of the Hall IC.

What is claimed is:

1. A torque detection device, comprising:
a torsion bar that couples a first shaft and a second shaft to each other;
a permanent magnet that is fixed to the first shaft, and that forms a magnetic field around the permanent magnet;
a magnetic yoke that is fixed to the second shaft, that is arranged within the magnetic field formed by the permanent magnet, and that forms a magnetic circuit in which a magnetic flux density changes in accordance with a change in a relative position between the magnetic yoke and the permanent magnet due to torsion of the torsion bar;
an annular magnetic flux collecting unit that includes an annular holder made of resin, having a holding protrusion on an inner periphery of the holder, and having a through-hole that extends through the holder and that is formed at a position next to the holding protrusion, a magnetic flux collecting ring that is fitted to the inner periphery of the holder by being held by the holding protrusion and that collects magnetic fluxes from the magnetic yoke, and a magnetic shield that is fitted to an outer periphery of the holder so as to cover the through-hole and that reduces influence of an external magnetic field on the magnetic circuit, the magnetic flux collecting unit being arranged so as to surround the magnetic yoke;
a magnetic sensor that detects magnetic fluxes that are generated in the magnetic circuit via the magnetic flux collecting ring; and
a sensor housing that is formed integrally with the magnetic flux collecting unit by supplying resin onto an outer periphery of the magnetic flux collecting unit, wherein
a resin flow passage is formed in the outer periphery of the holder, the resin that is supplied at the time of forming the sensor housing flowing into the through-hole through the resin flow passage.

2. The torque detection device according to claim 1, wherein the resin flow passage has a linear shape.

3. The torque detection device according to claim 1, wherein:

the holding protrusion has a first holding portion and a second holding portion that hold the magnetic flux collecting ring in a width direction of the magnetic flux collecting ring; and the through-hole is formed in the holder, at a position between a portion from which the first holding portion protrudes and a portion from which the second holding portion protrudes.

4. An electric power steering system, comprising the torque detection device according to claim 1.

5. The torque detection device according to claim 1, wherein the resin flow passage is defined by an indentation in the holder that extends across the holder in an axial direction.

6. The torque detection device according to claim 1, wherein the resin flow passage intersects the through-hole in a direction perpendicular to a longitudinal length of the through-hole.

\* \* \* \* \*